Figure 1:
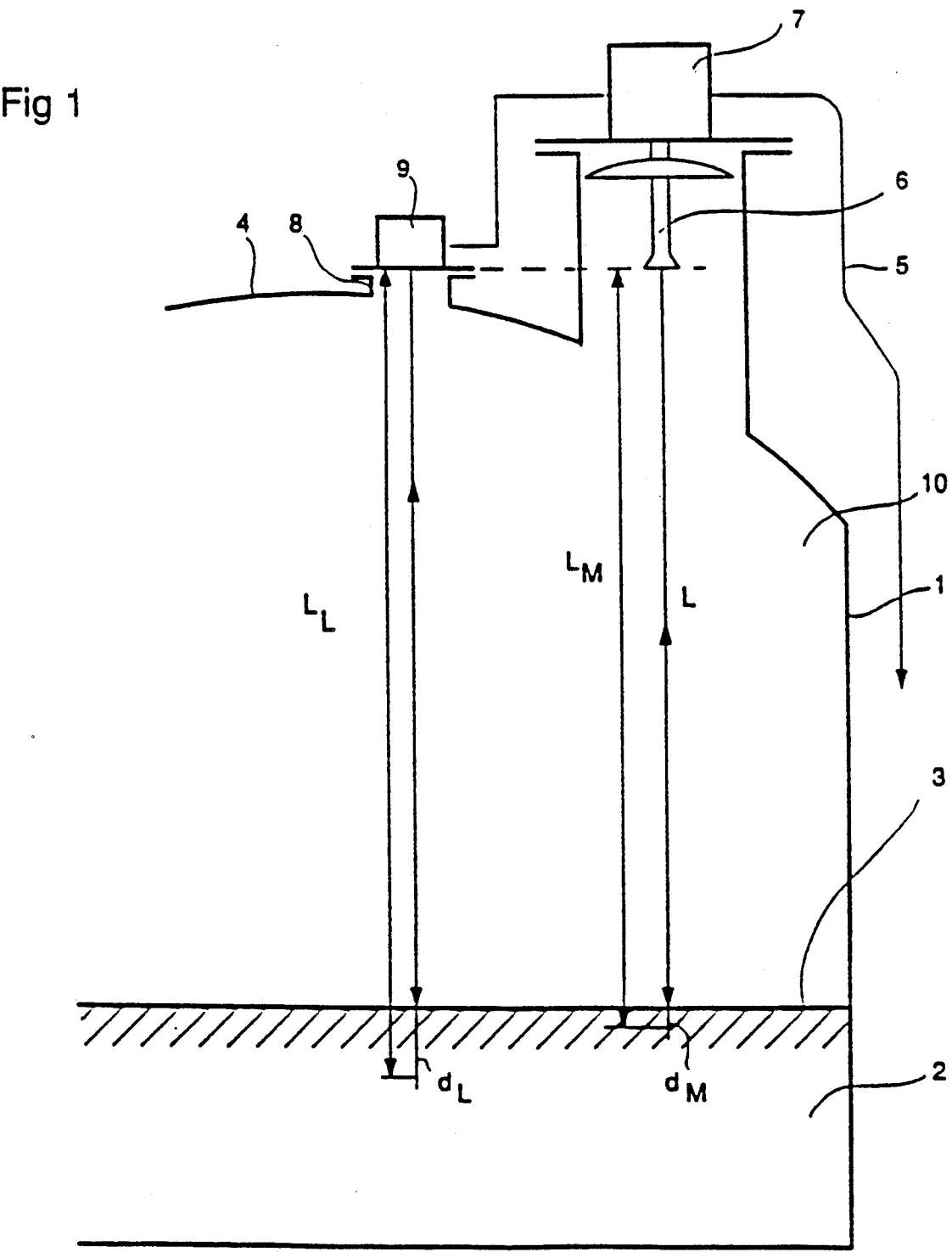

United States Patent [19]

Edvardsson

[11] Patent Number: 5,070,730
[45] Date of Patent: Dec. 10, 1991

[54] DEVICE FOR LEVEL GAUGING WITH MICROWAVE

[75] Inventor: Kurt O. Edvardsson, Linköping, Sweden

[73] Assignee: Saab Marine Electronics Aktiebolag, Sweden

[21] Appl. No.: 613,574
[22] PCT Filed: Mar. 27, 1990
[86] PCT No.: PCT/SE90/00194
§ 371 Date: Dec. 4, 1990
§ 102(e) Date: Dec. 4, 1990
[87] PCT Pub. No.: WO90/12292
PCT Pub. Date: Oct. 18, 1990

[30] Foreign Application Priority Data

Apr. 10, 1989 [SE] Sweden ............................ 8901260

[51] Int. Cl.$^5$ ............................................. G01F 23/28
[52] U.S. Cl. .................................. 73/290 V; 367/908; 342/124
[58] Field of Search .................... 73/290 R, 290 V; 181/124; 387/124, 129, 908; 343/772, 773, 786; 342/124

[56] References Cited

U.S. PATENT DOCUMENTS

| | | | |
|---|---|---|---|
| 2,960,078 | 11/1960 | Beard et al. | 367/908 X |
| 3,184,969 | 5/1965 | Bolton | 73/290 V |
| 3,286,098 | 11/1966 | Long et al. | 367/908 X |
| 4,101,865 | 7/1978 | Schurr | 73/290 V |
| 4,221,004 | 9/1980 | Combs et al. | 73/290 V X |
| 4,566,321 | 1/1986 | Zacchio | 73/290 R |
| 4,578,997 | 4/1986 | Soltz | 73/290 V |
| 4,641,139 | 2/1987 | Edvardsson | 73/290 R X |
| 4,661,817 | 4/1987 | Bekkadal | 73/290 R X |
| 4,670,754 | 6/1987 | Zacchio | 73/290 R X |
| 4,675,854 | 6/1987 | Lau | 367/908 |
| 4,700,567 | 10/1987 | Michalski | 367/908 X |
| 4,785,664 | 11/1988 | Reebs | 73/290 V |
| 4,821,569 | 4/1989 | Soltz | 367/908 X |

FOREIGN PATENT DOCUMENTS

| | | | |
|---|---|---|---|
| 12426 | 1/1980 | Japan | 73/290 V |
| 65-420 | 3/1989 | Japan | 73/290 R |
| 631786 | 11/1978 | U.S.S.R. | 73/290 X |

Primary Examiner—William A. Cuchlinski, Jr.
Assistant Examiner—G. Bradley Bennett
Attorney, Agent, or Firm—Lowe, Price, LeBlanc & Becker

[57] ABSTRACT

A device for gauging the level of a fluid in a container having a gas above the surface of the fluid. The device comprises a microwave transmitter transmitting a microwave radio signal through the gas to the surface and a receiver for receiving the microwave signal reflected by the surface. An electronic unit is arranged to calculate from the propagation time of the microwave signal a first distance from the transmitter to the surface of the fluid and thereby the level in the container. The microwave signal is preferably within the radar frequency range. A sound transmitter is also provided for transmitting a sound signal through the gas to the surface of the fluid and is capable of receiving a sound signal reflected from the surface of the fluid. A means is provided for correcting the first distance to a second corrected distance as a function of the microwave velocity and the known relation between the sound velocity and the microwave velocity.

6 Claims, 7 Drawing Sheets

Fig 5a
Fig 5b
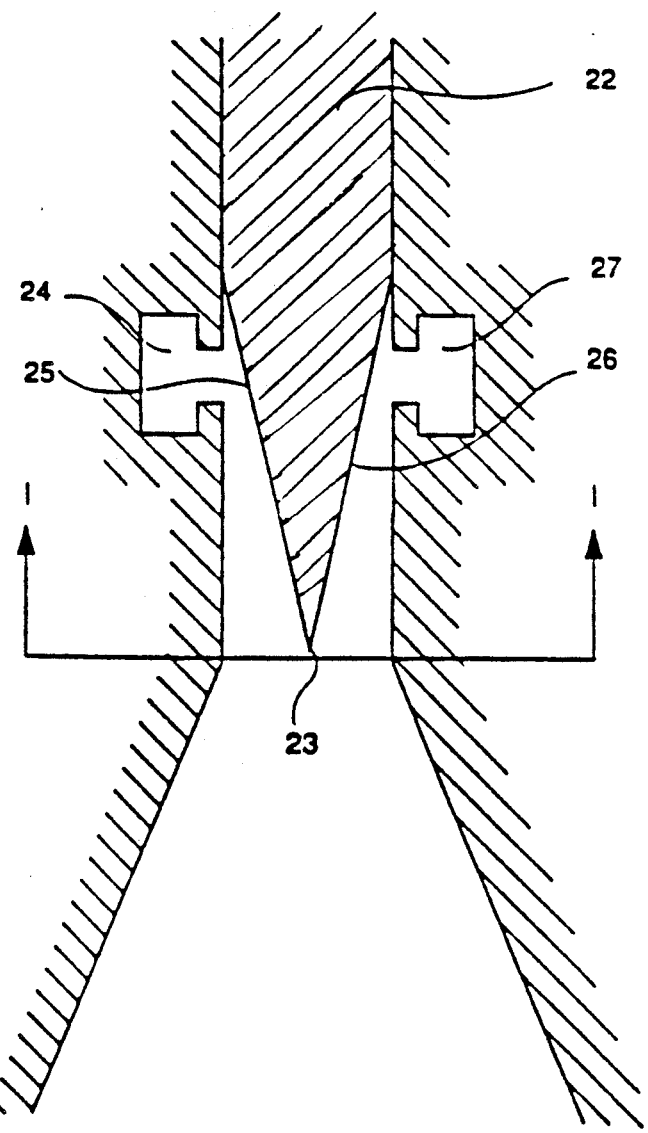
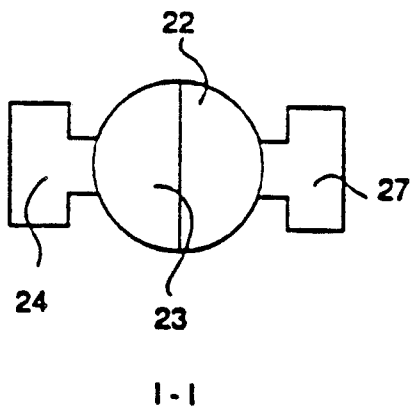

DEVICE FOR LEVEL GAUGING WITH MICROWAVE

The present invention relates to a device for gauging the level of a fluid in a container, above the surface of the fluid there being a gas, the device comprising a first transmitter for transmitting a microwave signal through said gas towards the surface of the fluid, a first receiver for receiving the microwave signal reflected against said surface, an electronic unit arranged to calculate from the propagation time of the emitted and reflected microwave signal a first distance from the first transmitter to the surface of the fluid and thereby its level in the container.

Such devices have increasingly come in use, particularly for petroleum products such as crude oil and products made thereof. By container it is meant in this context very large ones constituting parts of the total loading volume of a tanker as well as even larger, usually circular-cylindrical landbased tanks, with volumes of tens of thousands of cubic meters. Demands for accuracy of measurement have become increasingly greater. In some cases accuracy of measurement of 1 to 2 mm at a 20-meter distance from the transmitter to the surface of the fluid may be required. In order to achieve so high an accuracy of measurement special measures must be taken to eliminate disturbances. One problem frequently occurring in connection with level gauging of the kind mentioned in the introduction, particularly in what regards the container containing the petroleum products or other chemical products, is the condition that the gas above the surface of the fluid, i.e. the "tank atmosphere", shows a partial pressure of vaporized fluid and also usually a partial pressure of air and possibly water vapour. A vaporized petroleum product, i.e. a gaseous hydrocarbon, shows a somewhat lower velocity of translation for microwaves compared with air. This velocity of translation stands in a certain relation to the density of the gas. This means that the velocity of translation of the microwave, or the microwave velocity, depends on the condition in the gas above the fluid in the container. If the container is essentially filled with a petroleum product, the corresponding partial pressure of the hydrocarbons will be essentially equal to the steam pressure when a steady condition has been obtained, i.e. the gas is saturated with gaseous hydrocarbon. The steam pressure varies substantially for different fluids such as hydrocarbon products, from practically zero to atmospherical pressure and thereabove. If, on the other hand, the container is emptied, air flows in from the atmosphere and mixes with the gaseous hydrocarbon so that a mixture of gaseous hydrocarbon and air takes place. In connection with the emptying, the partial pressure of the air will be relatively high, but if the container is left unmoved, more hydrocarbon will evaporate from the surface and the partial pressure of the hydrocarbon will increase. It is evident that the microwave velocity will vary depending on the partial pressure of the hydrocarbon, which in turn means that the gauging result will show corresponding deviations from the correct values of level gauging.

There has long been a need for a simple possibility to correct the gauge values achieved with a device of the kind mentioned in the introduction taking into account the prevailing condition in said gas, but no such device has been provided.

The object of the present invention is to provide a simple and reliable device of the kind mentioned in the introduction that admits correction of the level gauging result achieved therewith. In its preferred embodiment the invention also admits that the correction becomes relatively independent of horizontal density gradient.

According to the invention such a device is characterized by a first means for gauging the sound velocity in said gas and a second means for correcting said first distance to a second distance with consideration to the microwave velocity in the gas through a known relation between the sound velocity and the microwave velocity.

The relation between the sound velocity and the microwave velocity is known for a large number of gases and gas mixtures. As to size it can be said that the sound velocity in a mixture of gaseous hydrocarbon and air is affected about 500 times more by the partial pressure of the hydrocarbon, i.e. proportion of the gas mixture, than the microwave velocity. This means that a level gauging effected above a fluid where there is a gas with a certain partial pressure of a gas corresponding to the fluid can be corrected with very great accuracy by gauging the sound velocity in the gas in question. If the same path is used for sound and microwaves the correction will be independent of the inhomogeneity.

The sound velocity and the microwave velocity, respectively, in gases and gas mixtures can be described with more or less complex formulas, according to the need for accuracy. What regards the aforementioned relationship between the sound velocity and the microwave velocity the demands for accuracy should be relatively moderate, which means that approximate formulas can be used.

The microwave velocity $v_m$ can be expressed as:

$$v_m = c/\sqrt{\mu_r \cdot \epsilon_r}$$

where
 c = microwave velocity in vacuum
 $\mu_r$ = relative permeability constant for the transmission medium
 $\epsilon_r$ = relative dielectricity constant for the transmission medium $\mu_r$ can be assigned the value 1 for the gases here in question, and therefore only the variation of the relative dielectricity constant with the gas composition must be considered.

For a gas $\epsilon_r$ can be calculated from the relationship:

$$(\epsilon_r - 1/\epsilon_r + 2) = \rho \cdot R/M$$

where
 $\rho$ = gas density
 R = molar refraction
 M = molecular weight

R can be calculated by adding certain data for atoms and bonds in a molecule. For a gas mixture the corresponding calculations can be effected. R can be approximated to being proportional to the molecular weight if there is a restriction to hydrocarbons. Some gases are polar which makes R seem bigger, and in that case R may have to be chosen according to the gas. For hydrocarbons it is not required to have detailed knowledge of the composition of the gas. $\epsilon_r - 1$ can be considered proportional to the density of the gas as long as $\epsilon_r$ is close to 1, which always is the case for gases close to atmospherical pressure (max. 1.01). For hydrocarbons an average of 0.0011 per 1 kg/m³ can be given. If the displaced air is taken into account it can be calculated that the microwave velocity decreases by 400 ppm (millionth parts) per kg hydrocarbon per m³, almost irrespective of what particular gaseous hydrocarbon. The given number is independent of the temperature within an interval of about 20° (i.e. usual storage temperature), but the increasing temperature will of course bring about an increased partial pressure of gaseous hydrocarbon above the surface of the fluid. Certain gases, such as water, ammonia etc., show a permanent moment of dipole which affects R in the relationship above.

For the sound velocity in a gas $v_1$ the following is true:

$$v_1 = \sqrt{\frac{C_p \cdot p}{C_v \cdot \rho}}$$

where
$C_P$=specific heat at constant pressure
$C_v$=specific heat at constant volume
P=pressure
o=density The density of air at 20° is about 1.2 kg/m³ while it is 3-3.5 kg/m³ for gaseous hydrocarbon of the kind in question. $C_P/C_v$ for air is 1.40 and for gaseous hydrocarbon about 1.15.

For gas mixtures there is a relationship for $v_1$ which is a modification of the above formula. The velocity $v_1$ will then be $$v_1 = \sqrt{(T/M)/(1/R - 1/C_p)}$$

where
T=absolute temperature
M=average molecular weight
R=gas constant
$C_P$=specific heat per mole (average)

Particularly if the partial pressure of the gaseous hydrocarbon is low the inverted sound velocity, i.e. the propagation time, increases essentially linearly with the density of the hydrocarbon. As an example it can be mentioned that the partial pressure of a hydrocarbon corresponding to the density 1 kg/m³ of the hydrocarbon gives a propagation time increase of 20% compared with the propagation time in air, while the corresponding figure for the propagation time of the microwave is a 0.04% increase. For high partial pressures of hydrocarbon the increase in the propagation time of the sound wave will not be linearly depending on the density but still a function of it.

In practice it often occurs during level gauging e.g. in tanks with petroleum products, that the density of the gas varies along the gauge length for the sound signal and the microwave signal. Regarding the sound signal it can be calculated approximately that the propagation time of sound is proportional to the average of the square root of the density, while regarding the microwave signal the propagation time is proportional to the density on the condition that the relative dielectricity constant is close to 1, which is true for the cases in question.

An analysis of some practical cases with some twenty-percent increase of the propagation time for the sound wave shows that the error regarding the propagation time increase of the microwave is limited to a few percent of the increase, which amounts totally to about 0.01-0.1% in the cases in question, which is well acceptable considering the intended correction at level gauging.

In a suitable embodiment of the device according to the invention said first means is arranged to emit a sound signal parallelly to said microwave signal towards the surface of the fluid, and is arranged to receive the sound signal reflected against said surface. In this way both the sound signal and the microwave signal will pass through the same gas, i.e. the transmission medium, with the same composition, possibly showing a density gradient.

It is advantageous to combine the first means and the transmitter of a microwave signal to a unit, preferably arranged to transmit the sound signal and the microwave signal essentially the same way. Constructively, this principle can be realized by letting said unit comprise a horn arranged to give directivity to both the sound signal and the microwave signal.

In an alternative embodiment of the device according to the invention the first means for gauging the sound velocity is formed with a second transmitter and a second receiver, both preferably located in the upper portion of the container. The advantage with this embodiment is a simple construction, but the drawback is that the sound signal and the microwave signal go different ways. Only provided that the gas above the fluid can be considered homogeneous and without density gradient can the gauging of the sound velocity be used directly for correcting the propagation time of the microwave signal.

To make possible the use of the above-described alternative embodiment of the device according to the invention also in those cases when the gas shows a gradient, the device is suitably equipped with a third means, constituting a computer that comprises a memory unit for storing a first gauge value of the sound velocity for a relatively high level of the fluid in the container, further comprising a calculating unit for calculating the sound velocity in a gas showing a density gradient, starting out from the first stored gauge value and a recently gauged second gauge value for the sound velocity corresponding to a relatively lower level of the fluid in the container, and from an algorithm stored in the computer describing a probable density gradient in the gas.

The device according to the invention can be formed in a number of ways, in addition to those mentioned above. The device can for instance comprise a vertical tube through which the microwave signal and possibly also the sound signal is led towards the reflecting surface of the fluid. The tube must naturally be provided with a number of openings along its longitudinal extension in order that the surface of the fluid will take the same level inside and outside the tube.

Figure 2:
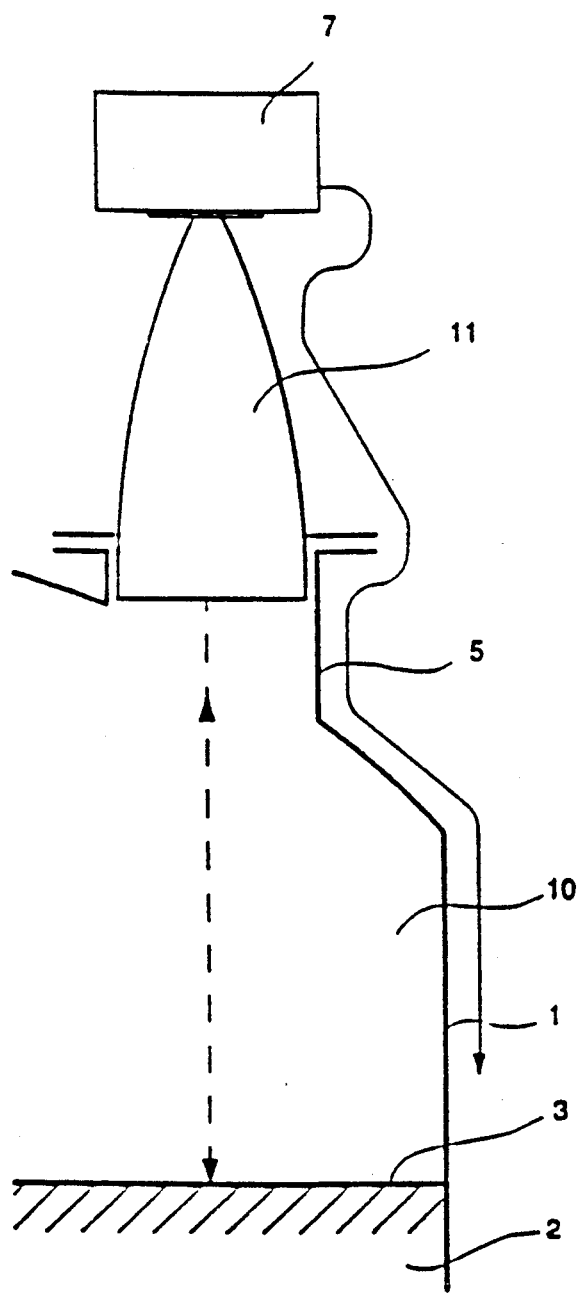
Figure 6:
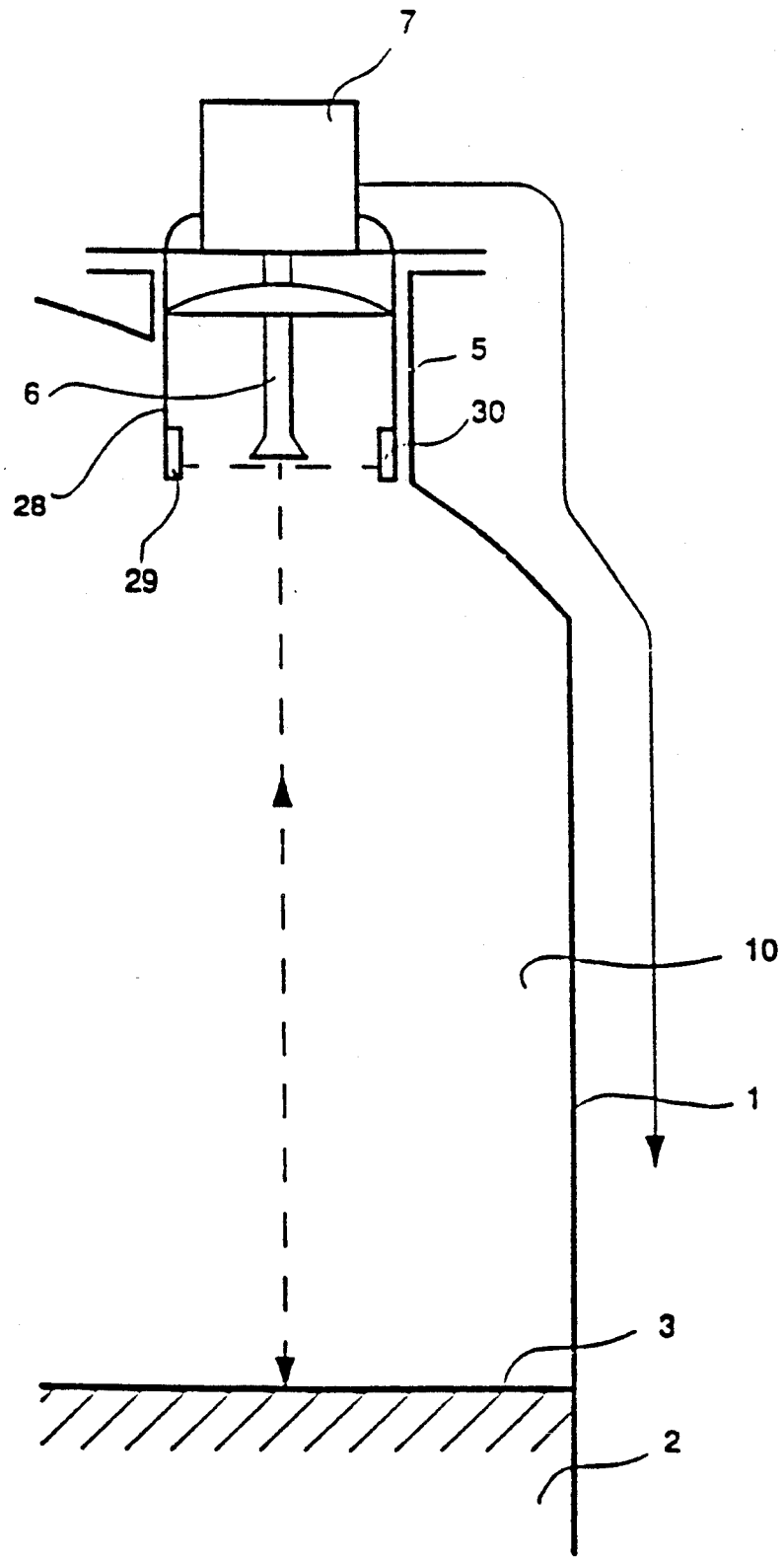
Figure 7:
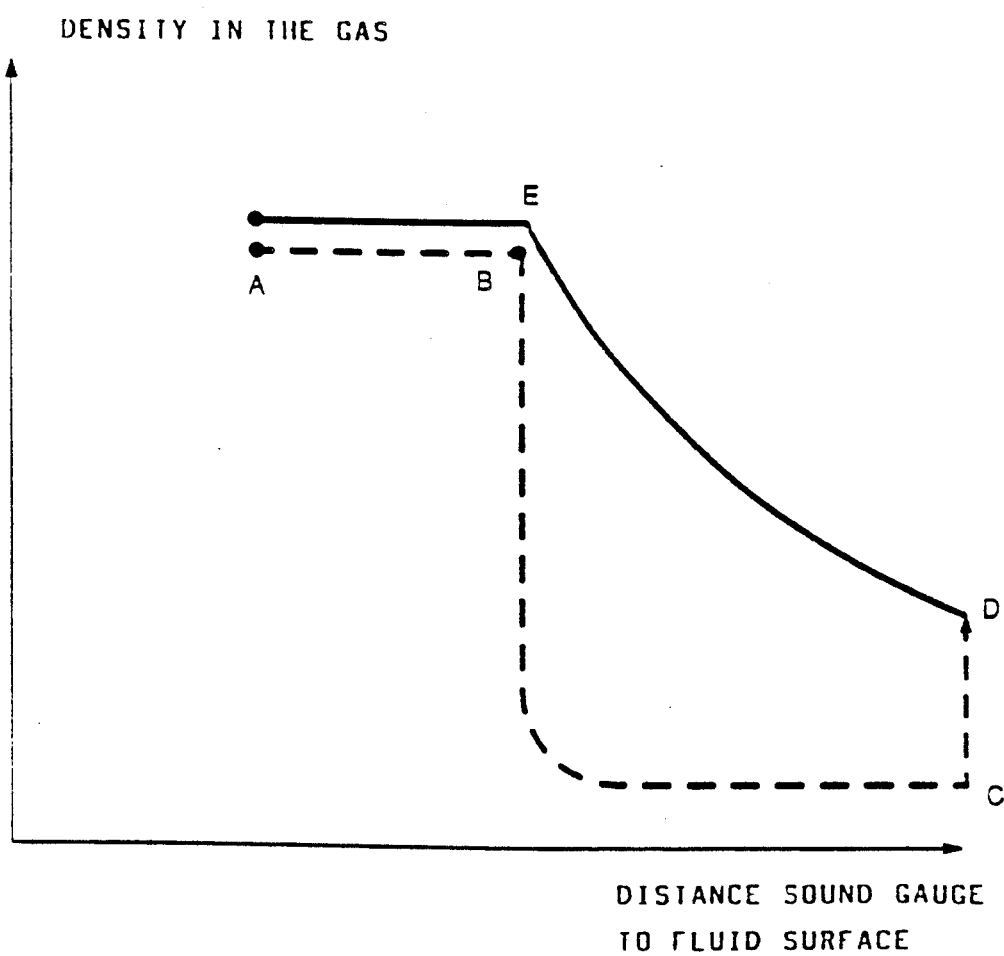

The device will now be described in more detail with reference to the accompanying drawings, in which FIG. 1 shows schematically a vertical cross section through a device according to the invention in a first embodiment;

FIG. 2 shows in the same manner a second embodiment of the device;

FIG. 3–5a,b show different detail embodiments of the device according to FIG. 2;

FIG. 6 shows schematically a vertical cross section through an alternative embodiment of the device according to the invention; and FIG. 7 shows a diagram of the gas density as a function of the distance, from a means for gauging the sound velocity according to FIG. 6 to the surface of the fluid.

In FIG. 1, 1 designates a container containing a fluid such as a petroleum product 2, with the surface 3. In the roof 4 of the container there are placed in a connection piece 5 a transmitter and a receiver 6 for transmitting and receiving a microwave signal, e.g. with λ=3.0 cm corresponding to the X band within the radar frequency range. An electronic unit 7 comprises among other things equipment for calculating from the propagation time of a microwave signal transmitted and reflected against the surface 3 a first distance to the surface of the fluid. In another connection piece 8 in the roof of the container there is located a first means 9 for transmitting and receiving a sound signal transmitted and reflected against the surface 3 of the fluid. If the space in the container between the surface 3 and the transmitter/receiver 6 and the means 9, respectively, is filled with a gaseous hydrocarbon with a certain partial pressure, i.e. density, the microwave velocity through the transmission medium, i.e. the gas, will be somewhat lower than if the transmission medium had been air. In FIG. 1 the correct distance is designated by L and the distance calculated by the electronic unit 7 is designated by $L_M = L + d_M$ where $d_M$ is a measure of the error measurement. The distance to the surface 3 measured by the means 9 with the aid of a sound signal is $L_L = L + d_L$ where $d_L$ is a measure of the increase of the distance from the correct distance L which is due to the sound velocity in the gaseous hydrocarbon being lower than in the air. With the knowledge of the relationship $d_L = k_1 \cdot d_M$ the following is obtained:

$$L = L_M - (L_L - L_M)/(k_1 - 1)$$

or when $k_1 \gg 1$ $$L = L_M - (L_L - L_M)/k_1$$

This correction is effected by a not shown second means included in the electronic unit 7.

For hydrocarbons it is true that in practice $k_1$ is independent of what hydrocarbon is in the container. This is important since the mixture is often unknown; e.g. petrol can contain about a thousand components. For other liquids, for instance polar liquid, $k_1$ can be chosen according to the content.

The transmitter for the microwave signal 6 and the means for transmitting a sound signal are in this case placed at the same height above the level of the fluid, which of course is not necessary as the required conversions considering different heights above the level of the fluid can easily be effected by said second means. It should be noted however, that it is an advantage f the sound waves and the microwaves go essentially equal distances through the gas in question.

In FIG. 2 an embodiment of the device according to the invention is shown schematically, comprising a horn 11, which leads both the microwaves and the sound waves to being transmitted and reflected essentially coincidingly.

Figure 3:
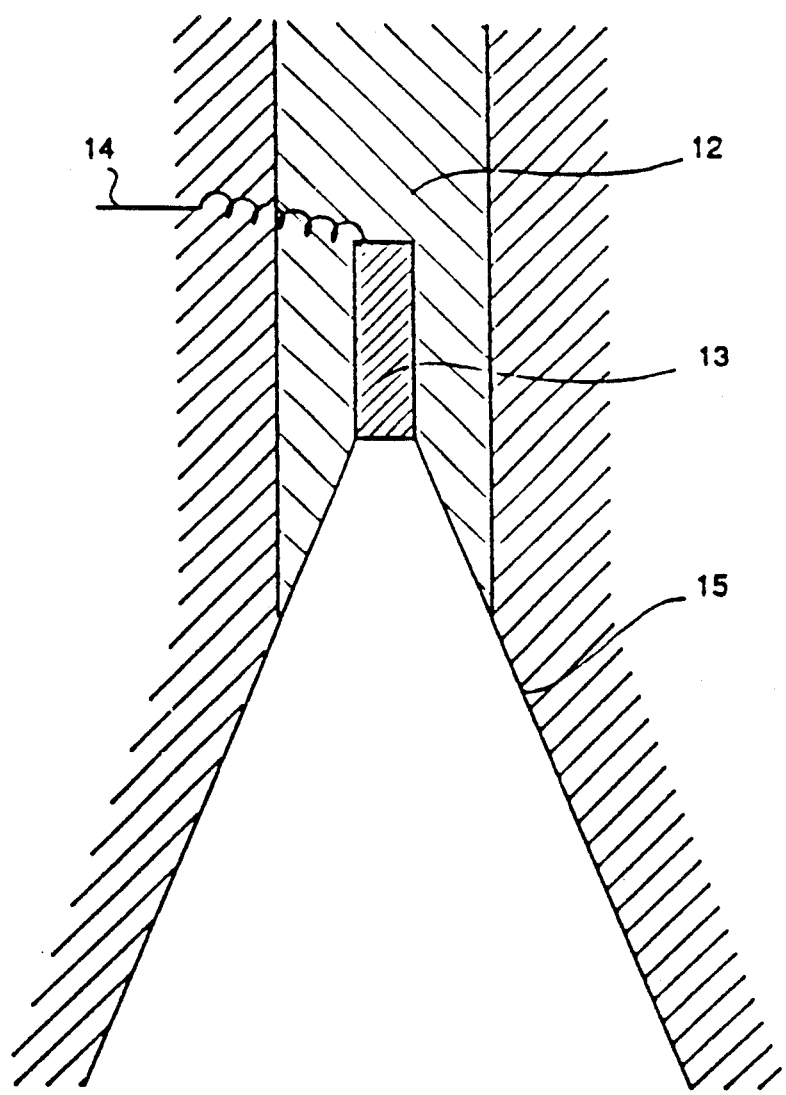
Figure 4:
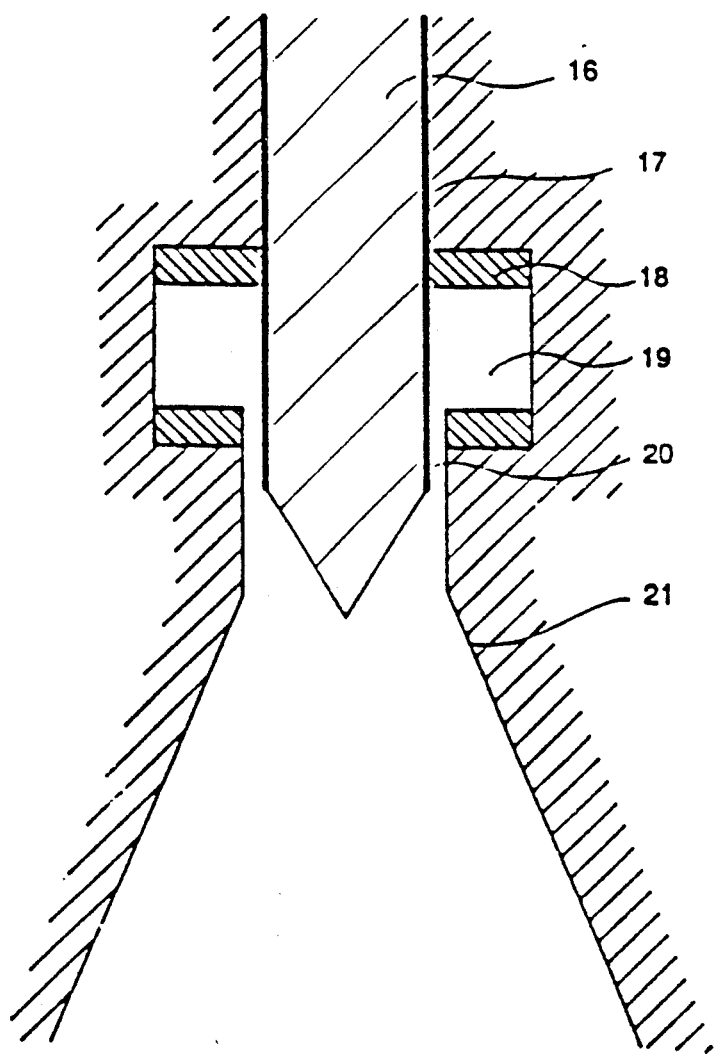

Some variants of embodiments according to FIG. 2 are shown in FIGS. 3 to 5. Of these the transmitter for the microwave signals shows a waveguide filled with a dielectric 12, a sound source and a receiver for reflected sound 13, with a lead-in 14 for sound signals and a horn with a wall 15.

The variant in FIG. 4 comprises a waveguide for microwaves 16 with dielectric filling. The waveguide is surrounded by a metal tube 17. A sound element 18 coaxial with the waveguide of piezo-electric or magnetostriction type surrounds the waveguide. Below the sound element 18 there is an acoustic resonator 19 arranged. In its lower portion there is a quarter-wave transformer 20 in the form of a ring slot which prevents the microwaves from extending that way but limits them from leaving the waveguide. The wall in a horn is designated by 21.

A variant with non-circular-symmetrical feeding of the sound waves is shown in FIGS. 5a and b. A waveguide 22 for microwaves is filled with dielectric and ends downwards with an edge 23 which is evident from the cross section according to the markings I—I, shown in FIG. 5b. A sound source 24 is arranged at the side of one wall 25 of the waveguide, which limits the wedge-shaped lower portion of the waveguide on one side. The sound signal is reflected by the wall 25 downwards, and returns after the reflection against the surface of the fluid to be reflected by the opposite wall 26 of the waveguide to a receiver or microphone 27.

If the waveguide has one-mode propagation for both microwaves and sound waves there is relatively great freedom to form the transition unsymmetrically maintaining the propagation of the mode.

An alternative embodiment of the device according to the invention is shown in FIG. 6. The designations in FIG. 1 are repeated for the corresponding parts of the device, but the sound gauging is effected via a sound source 29 arranged in a bracket 28, the sound source being directed towards a receiver or microphone 30, also mounted on the bracket 28. The distance between the sound source and the microphone can be about 0.5 m. As has been mentioned the drawback with this embodiment is that the sound signal does not go the same way as the microwave signal. This gives a satisfactory correction of the level gauging only if the gas 10 above the surface 3 of the fluid is homogeneous, i.e. does not show any density gradient. This is the case when the container has been filled with for instance a petroleum product, in which case the air has been displaced out of the container.

In order to make it possible to effect satisfactory corrections with the device according to FIG. 6 also in such cases when the gas is heterogeneous and shows a gradient the device can be supplemented with a third means constituting a computer comprising a memory for storing a first gauge value achieved when the container is more or less filled with fluid such as a petroleum product. This gauge value then constitutes a maximum density value for the gas in question, as it can be calculated that the space above the fluid is completely filled with homogeneous gas corresponding to the fluid. The third means also comprises a calculating unit which, starting out partly from the first stored gauge value and partly from a second gauge value corresponding to the recent level of the fluid, corresponding to a substantially lower density in the gas due to the mixture of air during the emptying of the container, and partly with the aid of an algorithm stored in the computer, which describes a probable density gradient in the gas, calculates the probable sound velocity in the gas, whereby an approximately satisfactory correction of the level gauged with the microwave signal can be effected.

In FIG. 7 the gauging method is described with a device according to FIG. 6 in case the gas in the container shows a gradient.

The shown diagram shows schematically the density of the gas as a function of the distance between the sound gauging means and the surface of the fluid. At an essentially filled container with homogeneous gas in the container the density value (i.e. corresponding to the sound velocity) A is gauged. When the container is emptied this density value is maintained at the beginning until a point B, when air which is flowing in begins to decrease the density to a lowest value, at the point C. If then the container is left without any measure the fluid will evaporate gradually and the density gauged at this relatively large distance to the surface reaches a value D. From earlier gauging, knowledge has been gained of the maximum density value E which can possibly occur in the container. It is now assumed the density gradient D-E, e.g. through gauging with extra equipment or with the aid of theoretical calculations of the dependency of the density on the height in the container, the density gradient D-E being stored in the computer in the form of an algorithm that is used for correction in the aforementioned manner.

The assumption that the density of the gas varies exponentially with the height above the surface of the fluid gives a simple algorithm, which usually is adaptable as an acceptable approximation.

I claim:

1. A device for gauging the level of a fluid in a container, above the surface of the fluid there being a gas, the device comprising a first transmitter for transmitting a microwave signal through said gas towards the surface of the fluid, a first receiver for receiving the microwave signal reflected against said surface, an electronic unit arranged to calculate from the propagation time of the emitted and reflected microwave signal a first distance from the first transmitter to the surface of the fluid and thereby its level in the container, characterized by a first means for gauging the sound velocity in said gas and a second means for correcting said first distance to a second distance as a function of the microwave velocity and a known relation between the sound velocity and the microwave velocity.

2. A device according to claim 1, characterized in that said first means is arranged to emit a sound signal parallel to said microwave signal towards the surface of the fluid, and is arranged to receive the sound signal reflected against said surface.

3. A device according to claim 1, characterized in that the first means and the transmitter of a microwave signal are combined to a unit, preferably arranged to transmit the sound signal and the microwave signal essentially the same way.

4. A device according to claim 3, characterized in that said unit comprises a horn arranged to give directivity to both the sound signal and the microwave signal.

5. A device according to claim 1, characterized in that the first means for gauging the sound velocity comprises a second transmitter and a second receiver, both preferably located in the upper portion of the container.

6. A device according to claim 5, characterized in that a third means, constituting a computer that comprises a memory unit for storing a first gauge value of the sound velocity for a relatively high level of the fluid in the container, further comprising a calculating unit for calculating the sound velocity in a gas showing a density gradient, starting out from the first stored gauge value and a recently gauged second gauge value for the sound velocity corresponding to a relatively lower level of the fluid in the container, and from an algorithm stored in the computer describing a probable density gradient in the gas.

* * * * *